Aug. 25, 1964 C. O. BOBBITT 3,145,971
SUPPORT PLATE FOR DIFFERENTIAL AND POWER DIVIDER ASSEMBLY
Filed Feb. 18, 1964 2 Sheets-Sheet 1
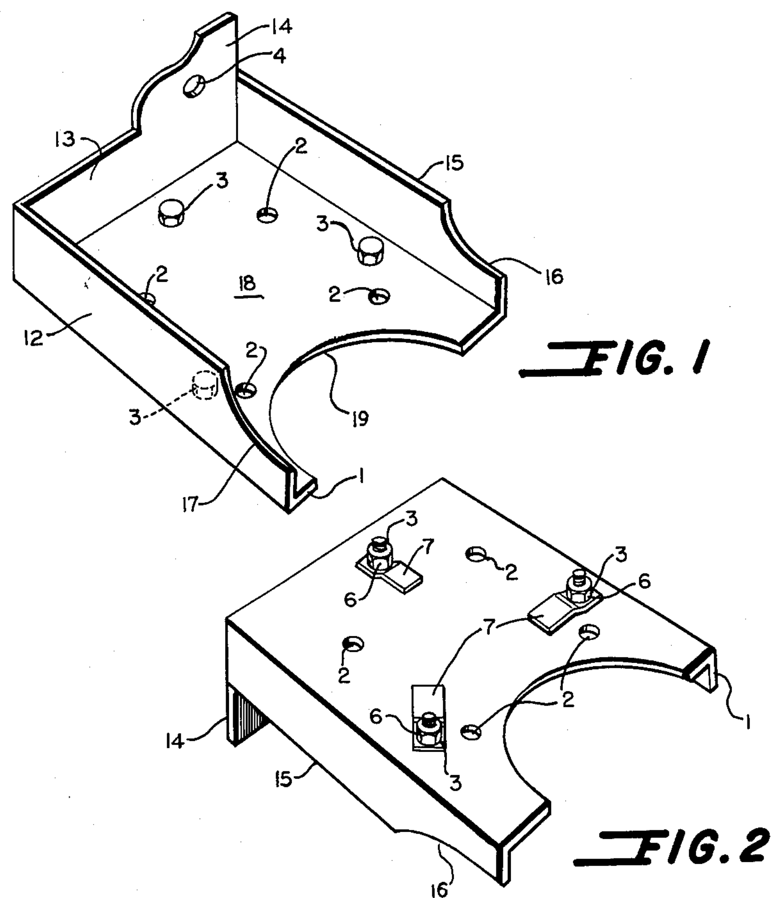
INVENTOR.
CHARLES O. BOBBITT
BY
ATTORNEY

SUPPORT PLATE FOR DIFFERENTIAL AND POWER DIVIDER ASSEMBLY

Filed Feb. 18, 1964 2 Sheets-Sheet 2

INVENTOR.
CHARLES O. BOBBITT

BY

ATTORNEY

United States Patent Office 3,145,971
Patented Aug. 25, 1964

3,145,971
SUPPORT PLATE FOR A DIFFERENTIAL AND POWER DIVIDER ASSEMBLY

Charles O. Bobbitt, 518 E. 3rd St., New Albany, Ind.

Filed Feb. 18, 1964, Ser. No. 346,386
5 Claims. (Cl. 254—133)

This application is a continuation-in-part of my earlier application Serial Number 167,855, for a Jiffey Plate to Remove and Replace the Eaton Differential Gear Case With Power Divider, filed January 22, 1962, now abandoned.

This invention relates to a support plate for a differential gear case and power divider assembly of the tandem rear axle type. More specifically, this invention relates to a support plate which may be used in conjunction with a conventional floor jack of the saddle type for removing the differential gear case and power divider assembly from the tandem axle assembly or for installing said differential and power divider assembly onto a tandem rear axle assembly.

The purpose of the invention is to provide a support plate which will balance said assembly whereby one mechanic may remove it from a truck, service said differential or power divider assembly and replace it onto the tandem axle of said truck.

A power divider assembly is conventionally used with the tandem or double axles of large trucks. This assembly divides the power between the front and rear axles of the tandem rear axle assembly. Power is transmitted from the transmission through the drive shaft to the input shaft of the power divider which provides equally divided power to both the forward and rearward axle units. The input shaft is equipped with a power divider differential spider and two floating cluster gears and carry differential pinions that engage the front and rear cluster gears mounted at the front and rear of the spider. Thus, the input shaft power is transmitted from its rear cluster gear to the forward axle drive pinion shaft transfer gear and drives the forward axle drive pinion.

The input shaft front cluster gear transmits its power to the output shaft transfer gear to the power divider output shaft.

These various gears are disposed at about a 45° angle within a housing projecting upwardly from the differential gear case. Thus, due to the weight of the entire assembly and to the fact that the weight of the gears and housing of the power divider assembly tend to throw the entire assembly off balance, removal of the assembly is extremely difficult.

This has been accomplished in the past through the use of two or more jacks or through the use of several mechanics. In normal operation, one jack is used to support the differential gear case and another jack to support the power divider assembly as the entire apparatus is removed from the rear axle. Difficulties have been encountered in synchronizing the movement of the two jacks and in maintaining the proper balance of the apparatus upon the two jacks so that the assembly would be in proper alignment for installation after servicing.

It will be appreciated, of course, that in servicing operations the use of an additional jack tends to crowd the area and thus further complicates the removal and installation procedures.

The object of this invention, therefore, is to provide a device in the form of a rectangular plate which will attach to the saddle of the conventional floor jack and which will hold the assembly in proper position for removal, service and installation. Another object of this invention is the provision of a support plate which may be easily attached to the saddle of a jack whereby a differential housing and power divider assembly may be secured thereto, the jack rolled to a convenient position for making repairs thereon and returned to its position in the rear axle of the vehicle without being removed from the support plate.

With these and other objects in mind, the invention comprises a rectangular base plate having two side walls and one end wall so as to be of an open end box-like construction. The open end of the base plate contains an arcuate opening in which the gear case of the differential fits and the two side walls are tapered downwardly at the end adjacent to the arcuate opening so as to cooperate with said opening in cradling the round differential gear case in a position so that the bolts in the flange of the power differential housing may be easily removed. The rear wall of the plate contains a bolt hole which registers with a bolt on the pinion gear cover plate so that one bolt may be removed from said plate and reinserted through the bolt hole to secure the entire assembly to the support plate. Thus, the cooperative action afforded by the cradling surface of the front and the securing action of the rear end of the support plate balances the entire assembly for easy removal.

Other features and advantages of the invention will appear from the following description taken in connection with the drawings where:

FIG. 1 is a view in perspective of the support plate of this invention illustrating the various parts and their relation to each other;

FIG. 2 is a bottom perspective view of said support plate which illustrates the attachment means whereby the plate may be secured to the saddle of a floor jack;

Figure 3:
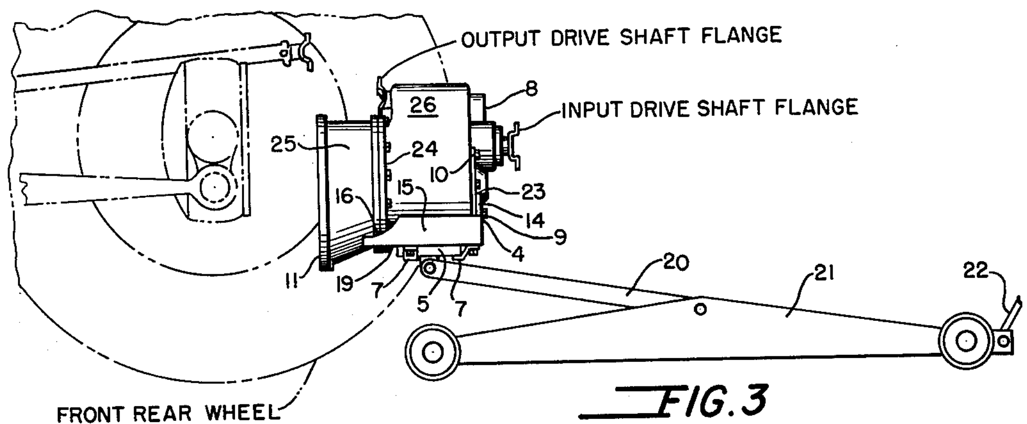
FIG. 3 is a side elevation of the support plate in position on a jack illustrating its relation to the front rear axle of a tandem tractor.

The support plate 1 is made up of five components, i.e., base plate 18, side walls 12 and 15, end wall 13, and attachment members 7. The base plate contains arcuate opening 19 at its open end, equally spaced openings 2 which register with the lugs of the jack saddle and bolt members 3 which rotatably support the attachment means 7. As best shown in FIG. 2, the attachment means in one modification consist of a steel trap bent at 45° at two points so as to form two legs in different parallel planes relates to each other. The upper leg is secured to the base member 18 by means of a bolt 3 and nut 6. In this manner the lower leg may be fitted under the jack saddle 5 and tightened if necessary by means of nut 6. Side walls 12 and 15 are tapered at the open end by a gently curved taper 16 and 17. These tapers cooperate with the arcuate opening 19 in supporting the flange 24 connecting the power divider housing 26 and the differential gear case 25 at a point on tapered walls 16 and 17 so that bolts may be removed from flange 24, even from the bottom (see FIG. 5), to separate the differential from the power divider for service. The base of the power divider housing 25 rests squarely on the base plate 18. By this arrangement, it is possible to remove the bolts from flange 24 to separate the power divider housing 26 from the differential gear case 25 in order to service the power divider or to remove bolts from the flange 11 of the differential gear case in order to service the differential.

Figure 4:
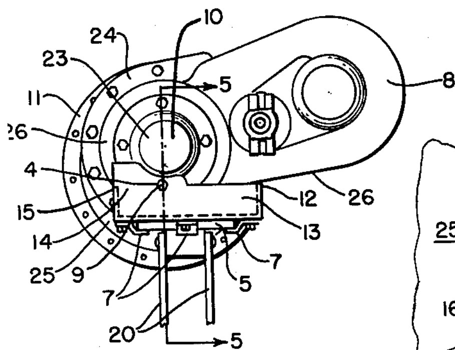
FIG. 4 is an end elevation illustrating the relation of the power divider and differential gear case to the support plate and the relation of the pinion gear case to the rear member of the support plate.
Figure 5:
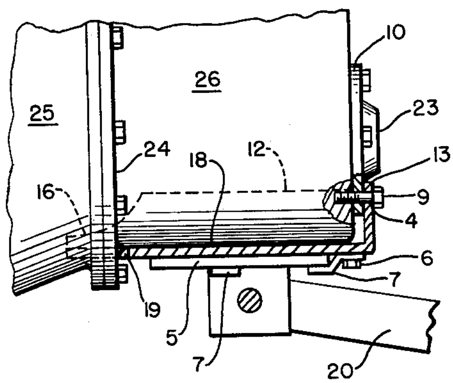
FIG. 5 is a view partly in section taken along lines 5—5 of FIG. 4 which illustrates the relation of the base of the power divider housing to the base of the support plate and the relation of the flange connecting the power divider housing and the differential gear case to the side members of the support plate and to the arcuate opening in the base of the support plate.

The end member 13 contains a raised portion 14 which contains bolt hole 4. As is best shown in FIGS. 4 and 5, bolt hole 4 registers with bolt 9 on the pinion bearing cover plate 10. Therefore, by removing the one bolt from the cover plate and reinserting it through bolt hole 4 and into the pinion bearing cover plate 10, the entire assembly is secured to the support plate. It will be noted that the raised portion 14 is curved. This curvature is designed to support the power divider assembly through pinion bearing cap 23. The end of the power divider assembly 8, consisting of the input drive shaft flange and the output drive shaft flange, is thus held at the proper angle for reattachment to said shafts once the support 1 is secured via clamping means 7 to the saddle 5 of arm 20 of jack 21. Thus, by manipulation of handle 22, once the input drive shaft is disengaged from its flange and the output drive shaft flange is disengaged from the output drive shaft, the entire assembly may be lowered from the rear axle, wheeled to another location, repaired and reinstalled.

It will be appreciated that I have provided a support plate which may be easily attached and removed from a saddle jack and which may be easily secured to the differential and power divider assembly and hold same in proper relation for servicing and installation. This may be done through the use of one mechanic and one jack as opposed to the prior practice of requiring two jacks and two or more mechanics.

It will be understood that other modifications within the scope of the appended claims may be made in the design and arrangement of parts without departing from the spirit of the invention.

I claim:

1. For use with a floor jack of the saddle type in positioning a differential gear case and power divider housing assembly of a tandem rear axle differential combination for removal from, or installation of said assembly on, said tandem rear axle differential combination;

(*a*) a power divider housing and differential gear case assembly support plate comprising: a rectangular base member, two side members, one end member and attachment means adapted to engage with a jack saddle in which (*b*) said base member has a flat planar surface for support of the base of the housing of said power divider and has an arcuate opening at its front end;

(*c*) said side members are disposed vertically from said base plate and tapered downwardly at the front end to cooperate with said arcuate opening in cradling said power divider housing and differential gear case assembly in a position for easy separation of the power divider housing from the differential gear case;

(*d*) said end member being disposed at the rear of the base plate and rising vertically therefrom and containing a bolt hole registerable with a bolt hole on the housing of said power divider, and (*e*) a bolt capable of projecting through said bolt hole of said end member to threadably engage with said power divider housing;

whereby said power divider housing and differential gear case assembly support plate may be secured to the saddle of a floor jack and secured to said differential gear case and power divider housing assembly with one bolt so that the said assembly is balanced thereon through the supporting action of said base plate, the cradling action of said side members and the securing action of the said end member in combination with said bolt.

2. A power divider housing and differential gear case assembly support plate as defined in claim 1 in which the base member contains evenly spaced openings adapted to register with the lugs of the jack saddle.

3. A power divider housing and differential gear case support plate as defined in claim 1 in which the side members form walls running the length of the base member and in which each wall has a downward taper at the end corresponding to the end of said base plate having the arcuate opening, said taper being gently curved so as to form a cradling surface.

4. A power divider housing and differential gear case assembly support plate as defined in claim 1 in which the end member forms an end wall for said base member, said wall having a raised portion at one end, said raised portion having a curved surface running upwardly and which levels off to an elevated plane relative to the height of said end member, said raised portion containing a bolt hole registerable with a bolt on said power divider assembly.

5. A power divider housing and differential gear case assembly support plate as defined in claim 1 in which said attachment means comprise a plurality of clamp members rotatably connected to the bottom of said base member, each of said clamp members comprising a steel strap bent twice at 45° so as to form two legs disposed in different parallel planes relative to each other and a connecting portion bounded by the angles forming the two legs.

No references cited.